United States Patent Office

3,556,876
Patented Jan. 19, 1971

3,556,876
PROCESS FOR TREATING NICKEL-IRON-BASE ALLOY STRIP TO INCREASE INDUCTION RISE AND PULSE PERMEABILITY
Friedrich Pfeifer, Oberissigheim, and Rudolf Deller, Hainstadt, Germany, assignors to Vacuumschmelze GmbH, Hanau, Germany, a corporation of Germany
Filed Jan. 8, 1968, Ser. No. 696,416
Claims priority, application Germany, Jan. 25, 1967, V 32,844
Int. Cl. C21d *1/04;* H01f *1/14*
U.S. Cl. 148—108   5 Claims

ABSTRACT OF THE DISCLOSURE

Nickel-iron-molybdenum alloy strip, optionally including copper, which has previously been subjected to an annealing treatment at a temperature between 950° C. and 1220° C. is annealed at a temperature in the range from 450° C. to 600° C. and rapidly cooled thereafter to improve the initial permeability, then the alloy strip is subjected to a final tempering anneal at a temperature in the range from 250° C. to 400° C. which is preferably conducted in a transverse magnetic field to improve induction rise, ΔB.

BACKGROUND OF THE INVENTION

Alloys having a large induction rise and a large pulse permeability are required for applications in the field of electronics; for example, in choke-coils employing bias with DC fields, and for pulse transformers which operate in a unipolar fashion. The larger the induction rise from the remanence of a transformer material, and the greater the pulse permeability, the smaller the number of windings required for a given cross-section of iron in order to transmit a given voltage-time area, and such properties can be used with benefit in devices of the type mentioned.

The high permeability nickel-iron alloys which have been available are not entirely satisfactory in providing a large induction rise and large pulse permeability, especially when it is desired to transmit a rectangular-shaped pulse so that the output-pulse has a short rise time and a small pulse slope. In this connection, according to H. Stegmeier ("Archiv der Elektrischen Ubertragung," 1965(5), page 257), a tape-wound core made of 0.03 mm. strip from a nickel-iron-molybdenum-copper alloy containing about 80% nickel, without bias, has a maximum induction-rise of only 2000 gauss, and a tape-wound core made of 0.003 mm. thick strip of the same alloy exhibits an induction rise of only 400 gauss. Also, according to H. Stegmeier, the highest obtainable value for ferrites is merely 3000 gauss.

In our copending patent application Ser. No. 676,116, filed Oct. 18, 1967, it is shown that the induction rise of a nickel-iron alloy containing 61 to 67% nickel can be improved to yield more than 8000 gauss. Although the use of such a material in pulse transformers leads to a large reduction in the rise time of the output pulse due to the increased induction rise, there is the further requirement for reduction of the pulse slope of the output pulse. In order to satisfy this requirement, which is especially desirable in the case of high quality transformers for the control of storage matrices, a material is required which possesses an exceptionally large pulse permeability not attainable with the alloys disclosed in our copending application Ser. No. 676,116, in addition to having a high induction. It is desirable, in order to transmit rectangular pulses of varying duration, that these magnetic properties be made available in a wide range of alloy strip thicknesses.

Similar requirements must be satisfied for high quality chokes. In this case, materials are required where use can be made of the highest possible permeabilities for large field strength modulations or induction values.

SUMMARY OF THE INVENTION

The invention is directed to a process for making a soft magnetic nickel-iron material having a large induction rise and a large pulse permeability or, the equivalent thereof, a high incremental permeability at induction values up to the highest modulation field strengths.

In accordance with this invention, soft magnetic materials such as a nickel-iron-molybdenum alloy, or a nickel-iron-molybdenum-copper alloy, in strip form, are subjected first to a high temperature anneal and are then given a special heat treatment, particularly, a heat treatment in a magnetic field, in a temperature range between 250 and 600° C.

Following the teachings of this invention, the induction rise of an iron-nickel alloy of composition 74 to 84% nickel, 0.5 to 6% molybdenum, up to 8% copper, balance iron, and which contains de-oxidizing and processing additions, and small amounts of incidental impurities, and especially of an alloy consisting of 75 to 82% nickel, 2 to 5.5% molybdenum, up to 5% copper, balance iron and with de-oxidizing and processing additions, and small amounts of incidental impurities, can be improved from a normal value of 2000 to 3000 gauss to above 5000 gauss. The improvement is obtained, in one preferred process, when the said magnetic material, or the magnet core from which it is made, is initially annealed for several hours and, more specifically, from 2 to 6 hours at a temperature between 950 and 1220° C. in an atmosphere having a low oxygen partial pressure. The said magnetic material is then cooled to a temperature below 200° C. and then, to induce a state of high initial permeability, the magnetic material is heated for about 1 to 3 hours at about 450 to 600° C. and, more particularly, between 460 and 550° C. (see "Zeitschrift für Metallkunde," 1966 (4), pages 295–300 and especially pages 296 and 297). The material is then rapidly cooled from this temperature in a period of about 5 to 15 minutes to a temperature below 200° C. and finally depending on the thickness of the strip, it is final temper annealed for one or more hours in the temperature range 250 to 400° C., a preferred range being 300 to 350° C., the said final temper annealing being preferably effected in a magnetic field whose lines of force in the hot magnetic material run at right angles to the subsequent direction of the magnetic flux. It has been found particularly beneficial to final temper anneal a strip of thickness 0.1 to 0.015 mm. for a period of 1 to 5 hours, and to final temper anneal strips of thicknesses ranging downwards from less than 0.015 to 0.003 mm. for periods of up to 50 hours. The material, when heat treated in this manner, not only possesses a large induction rise but also an especially high pulse permeability.

In accordance with the invention, the heat treatment to which such an iron-nicel alloy is subjected, to attain the desired magnetic characteristics, may also be accomplished in a somewhat different manner, which will now be described. Thus, the alloy strip material which has been annealed at a high temperature of from 950° C. to 1220° C. in an atmosphere having a low oxygen partial pressure, or the heat-treated magnetic core made from said material, may be cooled to an annealing temperature of from 460° C. to 550° C. subsequent to the high temperature anneal. The alloy strip is maintained at the temperature level for a number of hours, for example, from about 1 to 3 hours, until the state of high initial permeability is established. Thereafter, the material is quickly cooled to about 300° C. and maintained at that temperature level for a few hours. This latter final temper annealing treatment is preferably carried out in a transverse magnetic field.

The primary object of the invention is to provide a process for making a soft magnetic material which, in the thickness range from 0.1 to 0.003 mm., is characterized by an induction rise from the remanence which is greater than 3000 gauss and which, in addition, possesses an especially high pulse permeability.

Other objects of the invention will, in part, be obvious and will, in part, appear hereinafter.

DESCRIPTION OF THE PREFERRED EMBODIMENTS

Figure 1:
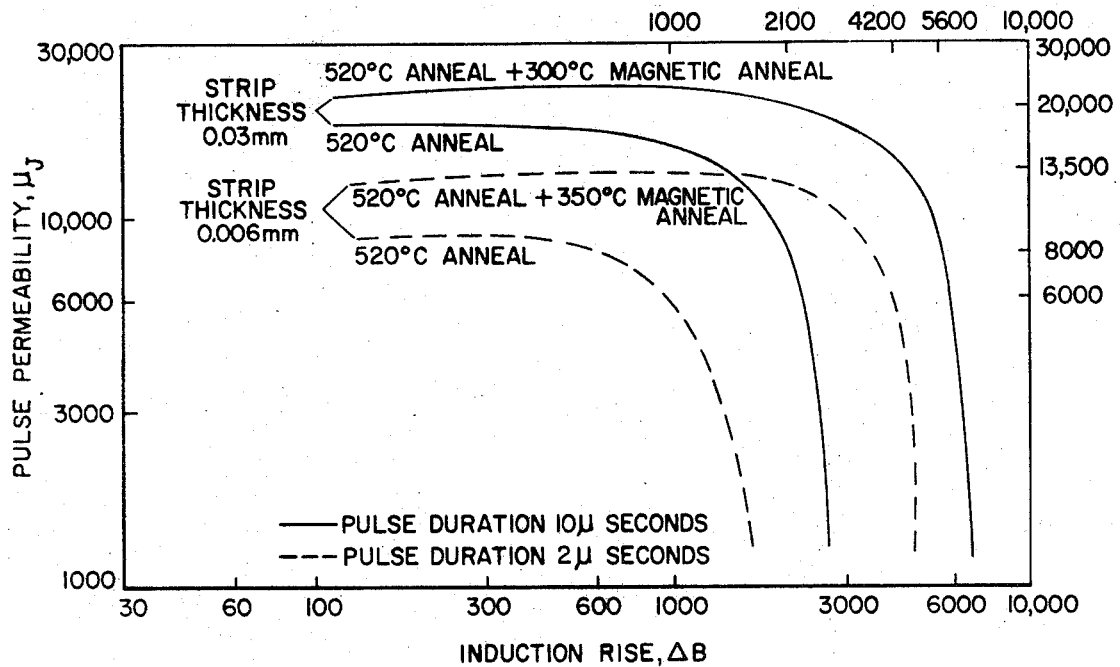
FIG. 1 presents a series of curves in which pulse permeability $\mu_J$, is plotted as a function of induction rise, $\Delta B$, for two alloys of two strip thicknesses, at two values of pulse duration, showing the effect of the final temper annealing treatment in a magnetic field.

The improvement in magnetic properties which can be achieved by employing the process of this invention will be evident from the examples set forth below. In the data given in the examples, the induction rise, $\Delta B$, is the difference between the ballistically measured induction at 1 oersted and the remanence. The permeability designated by the symbol $\mu_a$ in Table II was determined via a Maxwell bridge at 0.5 mOe and 70 Hz. $\mu_a$ is essentially equal to the initial permeability. In addition, as to practical working characteristics, the pulse permeability $$\mu_J = \mu_0 \frac{\Delta B}{\Delta H}$$

was determined for a series of examples for a constant pulse duration $t_d$ in the region of 1 to 50 $\mu$sec. (In the equation for evaluating the impulse permeability $\mu_J$, $\mu_0$ characterizes the permeability of empty space and $\Delta H$ the change in field intensity.)

EXAMPLES

Three nickel-iron-molybdenum-copper ingots A, B and C which had been vacuum melted, as well as a sintered nickel-iron-molybdenum compact D, with the chemical compositions in wt. percent as set forth in Table I, were hot-rolled to a thickness of 7 mm. and then cold-rolled with intermediate anneals to a final thickness of 0.1, 0.05, 0.03, 0.015 and 0.006 mm., respectively.

TABLE I

[Chemical compositions in wt. percent of Ni-Fe-Mo alloys]

| Alloy | Ni | Fe | Mo | Cu | Mn | Si |
|---|---|---|---|---|---|---|
| A | 75.9 | 15.55 | 3.38 | 4.25 | 0.6 | 0.07 |
| B | 76.05 | 14.35 | 3.95 | 4.75 | 0.61 | 0.09 |
| C | 76.0 | 15.75 | 3.35 | 4.4 | 0.5 | 0.08 |
| D | 81.3 | Rest | 5.0 | | | |

As may be seen from Table II below, the tape wound cores made from the above-described rolled strip were annealed for 4–5 hours at a high temperature (1000–1200° C.) in hydrogen, cooled to 200° C. and then reheated to 600° C. in order to initiate the high permeability condition, after which they were cooled to 550° C., or to 520° C., or 480° C., and held at this temperature for 2 hours. Following this intermediate annealing treatment, the tape wound cores were rapidly cooled to room temperature, magnetically tested (columns 8 and 9 in Table II) and, after testing, subjected for a number of hours to a magnetic tempering anneal in a transverse field at 300 to 350° C. in order to improve the induction rise. A permanent magnet material, such as alnico, is employed to establish the required magnetic field, although electromagnets may also be used.

The values of $\mu_a$ and $\Delta B$ obtained as a result of this magnetic temper anneal are listed in the last two columns of Table II.

TABLE II

[Heat treatment and magnetic annealing of tape-wound cores made of strip from the Ni–Fe–Mo alloys listed in Table I]

| Example | Alloy | Strip thickness, mm. | High temperature anneal Temp., °C. | High temperature anneal Time, hrs. | Heat treatment Temp., °C. | Heat treatment Time, hrs. | Magnetic values after heat treatment $\mu_a$ | Magnetic values after heat treatment $\Delta B$, gauss | Tempering with transverse field Temp., °C. | Tempering with transverse field Time, hrs. | Magnetic values after transverse field tempering $\mu_a$ | Magnetic values after transverse field tempering $\Delta B$, gauss |
|---|---|---|---|---|---|---|---|---|---|---|---|---|
| 1 | D | 0.1 | 1,200 | 5 | 550 | 2 | 88,000 | 3,200 | 300 | 1 | 67,000 | 4,900 |
| 2 | D | 0.1 | 1,200 | 5 | 550 | 2 | 88,000 | 3,200 | 300 | 2 | 50,000 | 5,800 |
| 3 | A | 0.05 | 1,200 | 5 | 520 | 2 | 78,000 | 3,000 | 300 | 1 | 37,000 | 7,370 |
| 4 | B | 0.03 | 1,100 | 4 | 480 | 2 | 94,000 | 2,200 | 300 | 1 | 84,000 | 3,850 |
| 5 | B | 0.03 | 1,100 | 4 | 480 | 2 | 94,000 | 2,200 | 300 | 2 | 49,000 | 6,170 |
| 6 | B | 0.03 | 1,100 | 4 | 480 | 2 | 94,000 | 2,200 | 300 | 3 | 38,000 | 6,630 |
| 7 | C | 0.03 | 1,100 | 4 | 520 | 2 | 78,100 | 3,000 | 300 | 1 | 42,100 | 6,340 |
| 8 | C | 0.015 | 1,000 | 4 | 520 | 2 | 51,500 | 2,200 | 300 | 4 | 39,800 | 5,500 |
| 9 | C | 0.015 | 1,000 | 4 | 520 | 2 | 47,300 | 3,060 | 300 | 4 | 37,100 | 5,200 |
| 10 | A | 0.006 | 1,000 | 4 | 520 | 2 | 24,600 | 1,470 | 350 | 40 | 20,350 | 5,730 |

FIG. 1 illustrates the improvement obtained in the induction rise $\Delta B$ and the pulse permeability $\mu_J$ as the result of final temper annealing in a transverse magnetic field at 300 to 350° C. in accordance with the invention. The improvement is demonstrated by comparison of results from alloy strip thus treated, with results from alloy strip in the condition subsequent to the annealing treatment at 520° C. The data is obtained from tape wound cores made from 0.03 mm. thick strip of alloy C and 0.006 mm. thick strip of alloy A. FIG. 1 represents pulse permeabilities $\mu_J$ as a function of induction rise $\Delta B$ for pulses of 10 and 2 $\mu$sec. duration, respectively. It can be inferred from the shapes of the curves obtained for the tape wound core of alloy C that, as a result of the magnetic temper anneal at 300° C. in a transverse field, carried out subsequent to the anneal at 520° C., the induction rise at a given pulse permeability $\mu_J$=8000 increases from 2100 to 5600 gauss. That is an increase by a factor of more than 2.5. With an induction rise fixed at 2100 gauss, the pulse permeability will rise as a result of the transverse field treatment from the value $\mu_J$=8000, by a factor of 2.5, to the value, $\mu_J$=20,000.

The shapes of the curves obtained for the strip of thickness 0.006 mm. from alloy A and made up in the form of tape wound cores show, that, due to the thermal and magnetic treatments carried out in accordance with the invention, with a fixed induction rise of 1000 gauss, the pulse permeability is raised from $\mu_J=6000$ to $\mu_J=13,500$. This amounts to an increase by a factor greater than two. With an impulse permeability fixed at $\mu_J=6000$, the induction rise increases from $\Delta B=1000$ gauss by a factor of more than 4 to $\Delta B=4200$ gauss.

The benefits to be derived from employing the process of the invention lie not only in the large improvement in the induction rise and in the great increase in pulse permeability over a wide range of strip thicknesses, but also in the ability to provide a desired induction rise, by means of suitable heat-treatment or combined heat treatments and magnetic anneal, together with a favorable pulse permeability. Similarly, a specified pulse permeability can be attained together with an induction rise appropriate to it.

Figure 2:
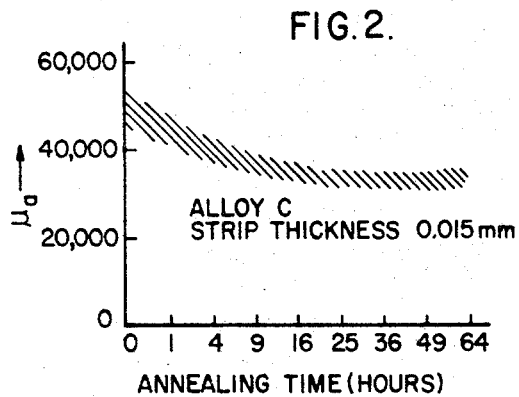
FIG. 2 sets forth a curve in which $\mu_a$ (essentially initial permeability) for one alloy is plotted against time in hours at the final temper annealing temperature.
Figure 3:
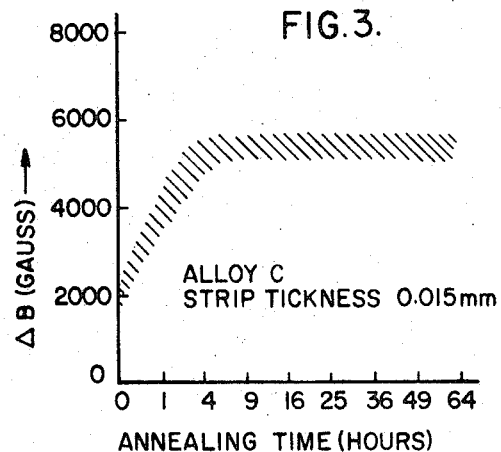
FIG. 3 shows a curve in which induction rise, $\Delta B$, for the alloy of FIG. 2 is plotted against time in hours at the final temper annealing temperature.

The relationships implied in Table II are shown graphically in FIGS. 2 and 3 wherein the values of $\mu_a$ and $\Delta B$ are plotted as a function of the annealing time for a tape wound core made from alloy C strip of thickness 0.015 mm. The typical magnetic values lie within the shaded area of each curve, for heat-treatment temperatures of 300 to 350° C. The figures show that, in annealing periods up to about 9 hours, the shorter annealing times produce higher values of $\mu_a$ and smaller values of $\Delta B$. Conversely, longer annealing periods produce smaller $\mu_a$ values and larger values of $\Delta B$. This relationship can be employed to match the magnetic properties with the magnetic requirements, such as those of communications technology, by means of intelligent choice of heat-treatment.

A heat treatment for nickel-iron-molybdenum alloy strip, which may contain a copper addition, has thus been disclosed which is capable, first of improving the initial permeability of the alloy strip, and, second, of improving the induction rise. The benefits to be gained from the use of such an improved alloy in the construction of control-transformers reside principally in that due to the large induction rise, and the very high pulse permeability characterizing the heat treated alloy, it is possible to obtain output pulses with a very short rise time and with a small pulse slope.

We claim as our invention:
1. A process for producing a nickel-iron base alloy strip characterized by a large induction rise having values in excess of 3000 gauss and a large pulse permeability value, the alloy consisting essentially of, by weight, from 74% to 84% nickel, from 0.5% to 6% molybdenum, up to 8% copper, balance iron with the usual de-oxidation and processing additions, and small amounts of incidental impurities, the steps comprising, subjecting the alloy strip to an initial high temperature anneal at a temperature of from 950° C. to 1220° C. for a period of from 2 to 6 hours, intermediate annealing the alloy strip in the temperature range from 450° C. to 600° C. followed by rapid cooling to produce a high level of initial permeability, and temper annealing the alloy strip at a temperature of from 250° C. to 400° C. for a period of at least one hour in a magnetic field in which the lines of force are transverse to the direction in which the magnetic flux will ultimately flow in the alloy strip in use to provide a high value of induction rise, $\Delta B$.

2. A process in accordance with claim 1 in which the intermediate anneal is carried out for a period of from 1 to 3 hours, and the alloy strip is thereafter rapidly cooled to below 200° C. in a period of from 5 to 15 minutes prior to final temper annealing.

3. A process in accordance with claim 1 in which the alloy strip is cooled from the high temperature anneal at about 900° C. to 1220° C. to the intermediate annealing temperature of from about 450° C. to 600° C. and annealing the alloy strip in this temperature range for from about 1 to 3 hours, quenching the alloy strip to a temperature of about 300° C. and temper annealing at that temperature for at least one hour.

4. A process in accordance with claim 1 in which the alloy strip is cooled from the initial annealing temperature of from 950° C. to 1220° C. to a temperature below 200° C., reheating the strip to an intermediate annealing temperature of from 450° C. to 600° C. to obtain high initial permeability, quenching the strip to a temperature below 200° C. in a time period of 5 to 15 minutes and temper annealing at a temperature within the range between 250° C. and 400° C. for a time period of 1 to 5 hours.

5. A process for producing a nickel-iron base alloy strip characterized by a large induction rise having values in excess of 3000 gauss and a large pulse permeability value, alloy strip having a composition of, by weight, from 75% to 82% nickel, from 2% to 5.5% molybdenum, up to 5% copper and the balance iron with deoxidizing and processing additions, and small amounts of incidental impurities, the alloy strip being processed in the form of a tape-wound core, the steps comprising, high temperature annealing the core in the range from about 1000° C. to 1200° C. for from about 4 to 5 hours in an atmosphere of hydrogen, cooling the core to about 200° C., reheating the core to about 600° C. to initiate the high permeability condition and cooling the core to a temperature in the range between 480° C. and 550° C. for about 2 hours, cooling the core to about room temperature, and then temper annealing the core at a temperature in the range from about 300° C. to 350° C. in a transverse magnetic field to improve the induction rise characteristic $\Delta B$.

References Cited

UNITED STATES PATENTS

| | | | |
|---|---|---|---|
| 1,586,884 | 6/1926 | Elmen | 148—13X |
| 1,586,889 | 6/1926 | Elmen | 148—13X |
| 1,762,730 | 6/1930 | McKeehan | 148—121X |
| 1,768,443 | 6/1930 | Elman | 75—170 |
| 1,910,309 | 5/1933 | Smith et al. | 148—121 |
| 2,002,696 | 11/1933 | Kelsall | 148—108 |
| 3,024,142 | 3/1962 | Parkin | 148—108 |

OTHER REFERENCES

Elman, G. W., "Magnetic Alloys of Iron, Nickel, and Cobalt," The Bell System Technical Journal, 1936, pp. 113–120, 126, 127, 131, and 132.

L. DEWAYNE RUTLEDGE, Primary Examiner

G. K. WHITE, Assistant Examiner

U.S. Cl. X.R.

148—121